(12) United States Patent
Theodore

(10) Patent No.: US 10,730,768 B2
(45) Date of Patent: Aug. 4, 2020

(54) METHOD FOR REDUCING SELENIUM AND HEAVY METALS IN INDUSTRIAL WASTEWATERS

(71) Applicant: Marcus G. Theodore, Salt Lake City, UT (US)

(72) Inventor: Marcus G. Theodore, Salt Lake City, UT (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 49 days.

(21) Appl. No.: 16/290,816

(22) Filed: Mar. 1, 2019

(65) Prior Publication Data

US 2019/0270657 A1    Sep. 5, 2019

Related U.S. Application Data

(60) Provisional application No. 62/637,530, filed on Mar. 2, 2018.

(51) Int. Cl.
| | |
|---|---|
| *C02F 1/32* | (2006.01) |
| *C02F 1/66* | (2006.01) |
| *C02F 1/70* | (2006.01) |
| *C02F 9/00* | (2006.01) |
| *C02F 101/10* | (2006.01) |
| *C02F 103/34* | (2006.01) |
| *C02F 101/20* | (2006.01) |

(52) U.S. Cl.
CPC ............... *C02F 1/705* (2013.01); *C02F 1/32* (2013.01); *C02F 9/00* (2013.01); *C02F 1/66* (2013.01); *C02F 2101/106* (2013.01); *C02F 2101/20* (2013.01); *C02F 2103/34* (2013.01)

(58) Field of Classification Search
CPC .......... C02F 1/32; C02F 1/325; C02F 1/5245; C02F 1/66; C02F 1/70; C02F 1/705; C02F 9/00; C02F 2101/106; C02F 2101/20; C02F 2103/18; C02F 2103/34
See application file for complete search history.

(56) References Cited

U.S. PATENT DOCUMENTS

2014/0151307 A1\* 6/2014 Theodore .................. C02F 1/32
                                                                210/716

\* cited by examiner

*Primary Examiner* — Lucas A Stelling
(74) *Attorney, Agent, or Firm* — Marcus G. Theodore

(57) ABSTRACT

An iron cation/sulfate alkalinization/sulfurous acid sulfide treatment method for industrial wastewaters to remove selenium and heavy metals to levels suitable for open stream discharge, land application, or power plant effluent discharge standards.

8 Claims, 1 Drawing Sheet
(1 of 1 Drawing Sheet(s) Filed in Color)

METHOD FOR REDUCING SELENIUM AND HEAVY METALS IN INDUSTRIAL WASTEWATERS

RELATED APPLICATIONS

The application claims the benefit of U.S. Provisional Patent Application entitled "Treatment Method Reducing Selenium and Heavy Metal in Industrial Wastewaters" filed Mar. 2, 2018, Ser. No. 62/637,530

BACKGROUND OF THE INVENTION

Field

This invention pertains to methods to remove selenium and heavy metals from industrial wastewaters. In particular it pertains to an iron cation/sulfate alkalinize/sulfurous acid sulfide treatment method for industrial wastewaters to remove selenium and heavy metals to levels suitable for open stream discharge or land application.

As used herein, the term industrial wastewaters are process waters, agricultural, petrochemical, industrial manufacturing, boiler blowdown, electric power production, and mining waters containing heavy metals and selenium. Heavy metals are defined as aluminum, barium, bismuth, cadmium, chromium, cobalt, copper, iron, lead, lithium, magnesium, mercury, nickel, scandium, silver, strontium, thallium, tin, and zinc.

State of the Art

Selenium is a naturally occurring trace element that can be concentrated and released in the waste materials from certain mining, agricultural, petrochemical, electric power production, and industrial manufacturing operations.

Selenium in its elemental base state Se (0) is harmless, but is rapidly oxidized to form selenite [Se (IV)] and selenate [Se (VI)] species, which are water soluble and hazardous. Selenite and selenate can be reduced to their elemental base state via various chemical reducing agents, and biological processes. Acidic and reducing conditions reduce inorganic selenite to elemental selenium, whereas alkaline and oxidizing conditions favor the formation of selenate. Because selenite and selenate are soluble in water, selenium is leached from well-aerated alkaline soils that favor its oxidation. In contrast, elemental selenium and selenides are insoluble in water; therefore, selenium tends to be retained in wet, poorly aerated soils where reducing conditions are present. Thus, selenium in alkaline soils is available for uptake by plants, whereas the availability of selenium in acidic soils tends to be limited by the adsorption of selenite and selenate to iron and aluminum oxide soils (NRC, 1983).

". . . The most relevant oxidation states of selenium in aqueous solution are −2, 0, +4 and +6. Selenium (−II) species ($H_2Se$, $HSe^-$ and $Se^{2-}$) are fairly rapidly oxidized to elemental selenium in air. Both selenium (IV) species ($H_2SeO_4$, $HSeO_4^-$ and $SeO_4^{2-}$) and selenium (VI) species $H_2SeO_4$, $HSeO_4^-$ and $SeO_4^{2-}$) are predominant in aqueous solutions, depending on the oxidation-reduction potential and pH of the solution.

Selenium is also a significant component in ores such as chalcopyrite, galena and pyrite. In smelting of copper and lead, the majority of selenium is concentrated in the anode slime formed during electrolytic refining of copper, but significant quantities are followed in the sludge accumulating in sulfuric acid plants and in the electrostatic precipitator dust collected during the processing of ores and concentrates. These three intermediate products have been processed for recovering some valuable metals and selenium by the pyro metallurgical and/or hydrometallurgical processes. The selenium-containing waste waters resulting from these processes should be treated in an environmentally acceptable manner. Five detailed reviews of the work on the removal of selenium (IV) and selenium (VI) from waste water were published by Koren et al. [1], Kapoor et al. [2], Mirza and Ramachandran [3] and Hata et al. [4] and Twidwell et al. [5], in which most works cited deal with precipitation, co-precipitation, adsorption, ion exchange, reverse osmosis elimination, chemical reduction and biological reduction of selenium entities. These processes are applicable to the removal of selenium (IV) from waste water, but not very effective to remove selenium (VI) under mild conditions. Hydrazine can reduce selenium (VI) to elemental selenium only in hot and concentrated sulfuric acid solution [6]. Although some anaerobic bacteria are capable of reducing selenium (VI) to elemental selenium [7-11], a weakness of this technique is that it requires days rather than minutes for the reduction;" See Chemistry of the M (M=Fe, Ca, Ba)—Se—$H_2O$ Systems at 25° C. molecules. ISSN 1420-3049, www.mdpi.com/journal/molecules, September 2009.

"How Much Selenium is Produced and Released to the Environment?

Production in 1985 was reported to be 429,515 pounds. Selenium compounds are released to the air during the combustion of coal and petroleum fuels, and during the smelting and refining of other metals.

From 1987 to 1993, according to the Toxics Release Inventory selenium releases to land and water totaled over 1 million lbs. These releases were primarily from copper smelting industries. The largest releases occurred in Utah. The largest direct releases to water occurred in Indiana;" See *Drinking Water Contaminants-Selenium*, APEC Water, https://freedrinkingwater.com/water-contamination/selenium-contaminants-removal-water.htm, Feb. 4, 2019

Because selenium and heavy metals in high concentrations are hazardous to public health, the Environmental Protection Agency has set water primary and secondary standards for selenium and heavy metal concentrations in drinking water and in waters before discharge into open streams or land application:

| | |
|---|---|
| Aluminum | 0.05 to 0.2 mg/L (50 to 200 μ/L) |
| Arsenic | 0.010 mg/L (10 μ/L) |
| Antimony | 0.006 (6 μ/L) |
| Barium | 2 mg/L (2000 μ/L) |
| Beryllium | 0.004 mg/L (4 μ/L) |
| Cadmium | 0.005 mg/L (5 μ/L) |
| Chromium | 0.1 mg/L (100 μ/L) |
| Copper | 1.3 mg/L (130 μ/L)[1] |
| Iron | .3 mg/L (300 μ/L)[2] |
| Lead | 0.015 mg/L (15 μ/L) |
| Manganese | 0.05 mg/L (50 μ/L) |
| Mercury | 0.002 mg/L (2 μ/L) |
| Nickel | 0.1 mg/L (100 μ/L) |
| Selenium | 0.05 mg/L (50 μ/L) |
| Silver | 0.1 mg/L (100 μ/L) |
| Thallium | 0.002 mg/L (2 μ/L) |
| Zinc | 5 mg/L (5000 μ/L)[3] |

[1] Lead and copper are regulated by a treatment technique that requires systems to control the corrosiveness of their water. If more than 10% of tap water samples exceed the action level, water systems must take additional steps. For copper, the action level is 1.3 mg/L, and for lead is 0.015 mg/L.
[2] EPA Secondary Drinking Water Standards: Guidance for Nuisance Chemicals; hazardous to health, but is considered a secondary contaminant with 1.3 mg/L leaving reddish brown stains on fixtures.
[3] Zinc is also a secondary standard where 5 mg/L leaves a metallic taste; see note 4, supra.

The pre-treatment method described below provides an inexpensive chemical method adding iron cations and sulfates to the wastewaters to insure sufficient iron cation concentrations for selenium co-precipitation when the pH is raised above 8.5 to form metal hydroxide precipitates with adsorbed selenium, calcium precipitates, and metal sulfate precipitates. These are removed forming a metal and selenium reduced filtrate. Sulfurous acid is added to the metal and selenium reduced filtrate to reduce the pH of the filtrate between 6.5 and 9 before exposing the filtrate to ultraviolet light to reduce any remaining selenium species for removal to produce a treated water suitable for open stream discharge or land application.

SUMMARY OF THE INVENTION

The method comprises a water treatment method to remove selenium and heavy metals from industrial wastewaters to a level suitable for open stream discharge or land application. Specifically, it comprises a water treatment method for wastewaters containing selenium and heavy metals comprising first adding iron cations and sulfates to the wastewaters to insure sufficient iron cations for selenium co-precipitation. Raising the pH of the iron adjusted wastewaters with lime to above pH 8.5 to form metal hydroxide precipitates with adsorbed selenium, calcium precipitates, and metal sulfate precipitates. Removing the metal hydroxide precipitates with adsorbed selenium and metal sulfate precipitates forming a metal and selenium reduced filtrate. Adding sulfurous acid to the metal and selenium reduced filtrate to adjust the pH of the filtrate between 6.5 and 9 and exposing the filtrate to ultraviolet light to reduce selenite to base selenium for filtration removal.

To reduce further any remaining selenium species, such as selenate, an additional reducing agent, such as sodium sulfide may be required to meet power plant selenium reduction standards of less than 1 ug/L. Adding sulfides to the pH adjusted metal and selenium reduced filtrate also precipitates metal and selenium sulfides for filtration removal to produce a treated water suitable for open stream discharge or land application. The sulfides used are selected from the group comprising sodium sulfide, hydrogen sulfide and ammonium sulfide, depending upon the composition required for effluent discharge. Aqueous sodium sulfide is readily available being widely used in the paper industry, and provides a relatively inexpensive reagent. It is not as hazardous to handle as hydrogen sulfide gas, but does not provide nitrate nutrients as ammonium sulfide does for land application.

Alternatively, the remaining selenium species and selenate may be removed with ion exchange resins, such as zeolites or natural zeolitic tuff or by biological treatment, such as packed bed reactors, fluidized bed reactors, moving bed biological reactors, and electro-biochemical reactors where bacteria under anoxic conditions reduces selenite and selenate to elementary selenium.

As industrial wastewaters from cooling towers may be infected with pathogens and viruses, the ultraviolet light exposure time of the method is selected to be sufficient to destroy any pathogens and viruses—usually ½ hour or less.

This water treatment method employs a number of chemical reductants reducing oxygen levels and may require oxidation via aeration or ozonation of the treated water to provide dissolved oxygen for open stream discharge.

For industrial waters also containing organic contaminants, the treatment may include the addition of activated carbon to sorb any remaining heavy metals, chemicals, pharmaceuticals, and organics.

Ferrous ions and sulfites also act as a reducing agent to reduce selenite to selenium metal, which precipitates as a solid and is removed with the coagulants. Additions of ferrous chloride/sulfate and alum may be added to enhance reduction precipitation. The bisulfites may also be energized with ultraviolet light to further enhance reduction.

The filtrate is then treated with hydrated lime to further concentrate the sulfites and raise the pH at levels to precipitate heavy metals, such as chromium. Mercury hydroxide is difficult to remove by filtration, so other reagents are required to remove this heavy metal. Any settling or coagulation occurring is then removed by additional filtration. Filtration not only removes suspended solids, but leaves an elevated sulfite filtrate that can be energized with ultra-violet light to reduce selenite to selenium metal for filtration removal, while disinfecting the filtrate. Selenate, as discussed, usually requires an additional reducing agent for reduction, or employment of ion exchange resins, or biological treatment, or ultra-filtration, such as desalinization.

In summary, the method comprises:

adding iron cations and sulfates to the wastewaters to insure sufficient iron cation concentrations for selenium co-precipitation, raising the pH of the iron adjusted wastewaters with lime to above pH 8.5 to form metal hydroxide precipitates with adsorbed selenium, calcium precipitates, and metal sulfate precipitates, removing the metal hydroxide precipitates with adsorbed selenium and metal sulfate precipitates forming a metal and selenium reduced filtrate, adding sulfurous acid to the metal and selenium reduced filtrate to adjust the pH of the filtrate between 6.5 and 9 and exposing the filtrate to uv light to reduce any remaining selenium species, and removing the metal and selenium precipitates to produce a treated water suitable for open stream discharge or land application.

To meet higher discharge removal standards, such as the power plant 1 ug/L selenium discharge standards or open stream discharge standards where fish are present, the method may be employed as a pre-treatment heavy metals and selenium removal method to reduce loading on other chemical, biological, reverse osmosis, or membrane treatment methods employed to remove the remaining selenium.

For example, sulfides may be added to the pH adjusted metal and selenium reduced filtrate to precipitate metal and selenium sulfides, which are then removed to produce a treated water suitable for effluent discharge. The sulfides are selected from the group comprising sodium sulfide, hydrogen sulfide and ammonium sulfide.

The ultra violet light exposure time is sufficient to destroy any pathogens and viruses.

After treatment, the effluent may be aerated to provide dissolved oxygen where required for open stream discharge.

Activated carbon may also be used with the effluent to sorb any remaining heavy metals, chemicals, pharmaceuticals, and organics.

The disadvantages of reverse osmosis and nanofiltration selenium removal are that they are costly and energy intensive.

The disadvantages of bioremediation and constructed wetlands selenium removal are that they are slow to remove selenium salts, required large footprints and therefore large capital costs, and involve complicated process controls Chemical removal process, which are faster, cheaper, and easier to control are therefore preferred.

The water treatment method thus provides an economical, fast chemical selenium removal method to meet different effluent discharge requirements.

The patent or application file contains at least one drawing executed in color. Copies of this patent or patent application publication with color drawing(s) will be provided by the Office upon request and payment of the necessary fee.

DESCRIPTION OF THE ILLUSTRATED EMBODIMENTS

Figure 1:
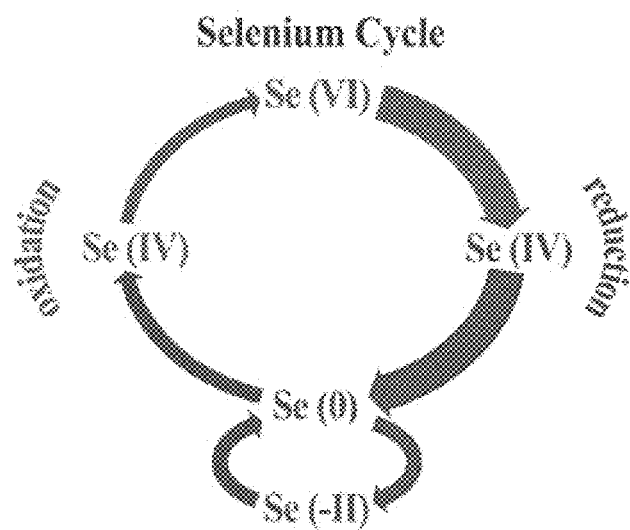
FIG. 1 is a selenium oxidation/reduction cycle.

FIG. 1 illustrates the selenium oxidation reduction cycle where base selenium is oxidized to harmful selenate and selenite species.

To evaluate this chemical reduction/precipitation and removal method, WesTech Engineering, Inc. of Salt Lake City, Utah provided certain selenium contaminated waters high in heavy metals in feed waters having 0.0976 mg/L selenium from a power plant's flue gas desulfurization (FGD) once-through cleaning stream, which was 48 times the reporting limit of 0.002 mg/l during its passage through the system as well as lab equipment and testing personnel assistance.

If selenium cannot be removed to levels within the clean water regulations, reducing Selenium IV and VI to Selenium (0) provides a safe way of land application. Ferric sulfate was selected as a precipitating agent, which also provided sulfates for heavy metals precipitate removal, such as lead sulfate.

500 ml of the raw composite second sample was then drawn and 10 ml ferric sulfate (67 gr/L or 0.1678 m/L) was added to the sample forming a slightly orange solution with a pH of 2.65.

Approximately 200 ml of lime water (1.5 gr/L at 25 degrees C.) was then added to raise the pH to 10.01 and stirred for 16 minutes until a ferric/metal hydroxide and metal/calcium sulfate precipitate layer was formed.

The ferric/metal hydroxide and calcium/metal sulfate precipitate bed layer was approximately $\frac{1}{7}^{th}$ (100 ml thick) and had a pH 9.62 of the 700 ml solution. To determine if the ferric sulfate/lime co-precipitate flock reduced the total selenium and any selenate, selenite to base elementary selenium to co-precipitate with the ferric hydroxide flock bed layer, the co-precipitates were decanted and removed by 0.45 μm filtration forming a clear slightly yellow tinged filtrate.

Approximately half of the filtrate (250 ml) was then sent to the TestAmerica Lab in Denver, Colo. for selenium speciation testing to determine if ferric sulfate addition alone is sufficient to reduce the individual selenite/selenate levels below 1 μg/L. The TestAmerica Lab results showed a selenate concentration of 24 Wl, and a selenite concentration of 1.8 μl, which did not meet the 25 MW power industry threshold levels required of 5 μg/L.

The other approximately half of the filtrate (300 ml) was further reduced with the addition of 10 mL pH 1.1 sulfurous acid addition, which lowered the filtrate to pH 2.49 forming a clear filtrate solution.

This clear filtrate solution was then irradiated with UV-L light (λ 253.7 nm) light for ½ hour. The acidified UV sample was then sent to the Denver TestAmerica Lab for comparison selenium speciation testing and total selenium and heavy metals testing. This last sample met all the clean water guidelines with the exception of mercury and reflected a reduction of any the selenite/selenate species remaining

| | Results | EPA Standard |
|---|---|---|
| Arsenic | ND | 0.010 mg/L (10 μ/L) |
| Chromium | 3.8 μ/L | 0.1 mg/L (100 μ/L) |
| Copper | 7.3 μ/L | 1.3 mg/L (130 μ/L) |
| Iron | 210 μ/L | .3 mg/L (300 μ/L) |
| Lead | ND | 0.015 mg/L (15 μ/L) |
| Mercury | 0.6 μ/L | 0.002 mg/L (2 μ/L) |
| Selenium | 18 μ/L | 0.05 mg/L (50 μ/L) |
| Zinc | 15 μ/L | 5 mg/L (5000 μ/L) |

Selenate reduced from 24 to 20 μ/L. Selenite reduced from 1.8 to 0.35 μ/L. Selenocyanate was 29 μ/L. As the total selenium in these species was 18 μ/L, well under the clean water standards, and heavy metals were similarly compliant, additional confirmation testing was conducted, with mercury removal separately addressed.

On Oct. 12, 2017, a raw (pH 7.45, 20° C.) sample, was heated with sulfurous acid sample for one hour (pH 2.51, 65-70° C.) and sent to TestAmerica for preliminary selenium speciation testing. These preliminary tests showed:

| Raw | Selenate 59 ug/L | Selenite 18 ug/L | Selenocyanate ND |
|---|---|---|---|
| Treated | Selenate 57 ug/L | Selenite 0.23 ug/L | Selenocyanate ND |

These results showing little reduction of selenate with sulfurous acid at low pH generation of free $SO_2$. These results conflicted with the literature where acidic thiosulfate treatment produces free $SO_2$ to reduce both selenite and selenate. ConocoPhillips Company's Method for Removing Selenium from Water, WO2011/106706 filed Sep. 1, 2011 used thiosulfates, which are stable only in neutral or alkaline solutions, under acidic conditions to decompose the thiosulfite into sulfur and sulfur dioxide reducing agent for both selenite and selenate reduction:

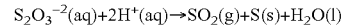

$$S_2O_3^{-2}(aq)+2H^+(aq) \rightarrow SO_2(g)+S(s)+H_2O(l)$$

Figure 2:
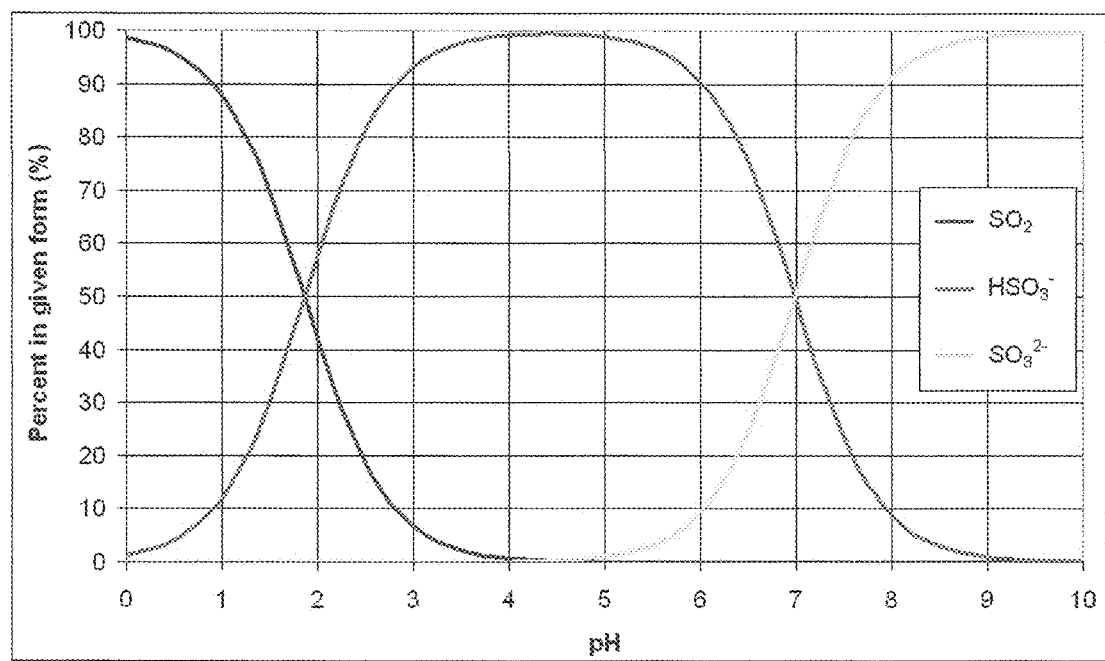
FIG. 2 below is a sulfurous acid specie concentration curve for various pH levels.

Sulfurous acid $(H_2O+SO_2=H_2SO_3=H^++HSO3^-)$ also releases $SO_2$ out of solution at low pH shifts. The amount of sulfurous acid free $SO_2$, sulfite, and bisulfite in aqueous solutions vary based on acid pH concentration as illustrated in FIG. 2 showing the distribution of the different species at various pH values.

At the low pH 2.5 conditions, sulfurous acid releases significant free $SO_2$, which should have reduced both selenite and selenate according to the ConocoPhillips Company test results. However, the TestAmerica selenium speciation test results showed that only selenite was reduced by $SO_2$ generation. These TestAmerica results would indicate that for both selenite/selenate reduction at low pH, another reducing agent or additional energizing of the bisulfite for selenate reduction is required.

To resolve this literature conflict, a final definitive test was conducted on Nov. 27, 2017.

A composite raw selenium sample was prepared having a pH of 7.87 with a yellow tinge, and sent to American West Analytics Laboratories in Salt Lake City, Utah to test for total selenium, and heavy metals As, Hg, Pb, Fe, Zn, Cu, and Cr. The American West Analytics Laboratories independent lab test results showed:

| Nov. 27, 2017 Raw Sample 2 | |
|---|---|
| Arsenic | <.00200 mg/L |
| Chromium | <.00200 mg/L |
| Copper | 0.00512 mg/L |
| Iron | 0.18800 mg/L |
| Lead | <00200 mg/L |
| Mercury | 0.00218 mg/L |
| Selenium | 0.0563 mg/L |
| Zinc | 0.0926 mg/L |

Testing of the second raw sample with ferric sulfate addition to add additional iron and sulfates coupled with lime addition was then performed as outline below. Sulfurous acid ultra violet light treatment of the filtrate was also performed to alter the selenium species composition.

500 ml of the raw composite second sample was drawn and 10 ml ferric sulfate reducing agent (67 gr/L or 0.1678 m/L) was added to the sample forming a slightly orange solution with a pH of 2.65.

Approximately 200 ml of lime water (1.5 gr/L at 25 degrees C.) was then added to raise the pH to 10.01 and stirred for 16 minutes until a ferric/metal hydroxide and metal/calcium sulfate precipitate layer was formed.

The ferric/metal hydroxide and calcium/metal sulfate precipitate bed layer was approximately $1/7^{th}$ (100 ml thick) and had a pH 9.62 of the 700 ml solution. To determine if the ferric sulfate/lime co-precipitate flock reduced the total selenium and any selenate/selenite to base elementary selenium to co-precipitate with the ferric hydroxide flock, the co-precipitates were decanted and removed by 0.45 μm filtration forming a clear slightly yellow tinged filtrate.

Approximately half of the filtrate (250 ml) was then sent to the TestAmerica Lab for selenium speciation testing to determine if ferric sulfate addition alone is sufficient to reduce the individual selenite/selenate levels below 1 μg/L. The TestAmerica Lab results showed a selenate concentration of 24 μ/L and a selenite concentration of 1.8 μ/L, which did not meet the threshold levels required for 25 MW power plant discharge or clean water compliance.

The TestAmerica Lab UV sample results showed total selenium was 48 μ/L, again well above the power plant discharge level of 5 μ/L, but within clean water compliance.

The other approximately half of the filtrate (300 ml) was further reduced with the addition of 10 ml pH 1.1 sulfurous acid addition, which lowered the filtrate to pH 2.49 forming a clear filtrate solution.

This clear filtrate solution was then irradiated with UV-L light (λ 253.7 nm) light for ½ hour. The acidified UV sample was then sent to the Denver TestAmerica Lab for comparison selenium speciation testing and total selenium and heavy metals testing. This last sample met all the clean water guidelines with the exception of mercury and reflected a reduction of any the selenite/selenate species remaining

| | Results | EPA Standard |
|---|---|---|
| Arsenic | ND | 0.010 mg/L (10 μg/L) |
| Chromium | 3.8 μg/L | 0.1 mg/L (100 μg/L) |
| Copper | 7.3 μg/L | 1.3 mg/L (130 μg/L) |
| Iron | 210 μg/L | .3 mg/L (300 μg/L) |
| Lead | ND | 0.015 mg/L (15 μg/L) |
| Mercury | 0.6 μg/L | 0.002 mg/L (2 μg/L) |
| Selenium | 18 μg/L | 0.05 mg/L (50 μg/L) |
| Zinc | 15 μg/L | 5 mg/L (5000 μg/L) |

The exact pH for metal hydroxide removal was selected upon presence of the metal species to be removed. For example, pH 9 is selected for copper precipitation. pH 10 is used for lead removal, and pH 9.5 for zinc removal. Mercury can be co-precipitated with ferric sulfate by elevating the pH to 8; see "Coprecipitation of Mercury (II) with Iron (III) Hydroxide", Yoshikazu Inoue et al, Environmental Science and Technology, 1979, 13(4), pp 443-445.

The selenium species are important as each poses a different hazard to humans. Toxic levels of selenium in the form of SeCN— (selenocyanate) being the most hazardous as opposed to selenite and selenate; see "The acute bacterial toxicity of selenocyanate anion and the bioprocessing of selenium by bacterial cells", Environmental Biotechnology 8(1) 2012, pp. 32-38. Based on the ferrous/ferric treatment test results followed by UV energized bisulfite/sulfite treatment of the filtrates, selenite was reduced to the lowest levels, leaving only selenate in solution.

Conversely the secondary treatment of the filtrates with another reducing agent, such as sodium sulfide, produced the highest levels of selenocyanate and lowest selenite levels. Consequently, the selenium species desired determines the methodology required. For example, samples reduced with a second reducing agent, such as ferrous sulfate or sodium sulfide reduced selenate from 24 to 20 μ/L, selenite from 1.8 to 0.35 μ/L, and selenocyanate at 29 μ/L even though the total selenium was 18 μ/L. As the total selenium in this last sample was 18 μ/L, well under the clean water standards, and heavy metals were similarly compliant, additional confirmation testing was conducted, with mercury removal separately addressed via the addition of sodium sulfide and filtration of any metal and selenium sulfide precipitates for compliance with the clean water standards. An exception is when cyanate is present, forming hazardous Selenium cyanate (SeCN⁻), which is reduced with acid addition below pH 5.5 in the presence of $Ca^{+2}$ to free Se (O) for filtration removal.

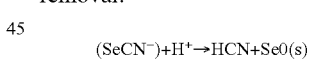

$$(SeCN^-)+H^+ \rightarrow HCN+Se0(s)$$

On Feb. 7, 2018 confirmation tests were conducted using powdered ferrous sulfate and lime to avoid any dilution effects from previously using limewater pH adjustment. A clear composite raw selenium sample was prepared having a pH of 7.97, and sent to American West Analytics Laboratories to test for total selenium, and heavy metals As, Hg, Pb, Fe, Zn, Cu, and Cr.

The American West Analytics Laboratories independent lab test results showed:

| Nov. 27, 2017 Raw Sample 2 | |
|---|---|
| Arsenic | <.00200 mg/L |
| Chromium | <.00200 mg/L |
| Copper | 0.00624 mg/L |
| Iron | <0.100 mg/L |
| Lead | <00200 mg/L |
| Mercury | 0.000860 mg/L |
| Selenium | 0.0529 mg/L |
| Zinc | 0.0668 mg/L |

This raw sample almost met the clean water total selenium 0.05 mg/L threshold.

Powdered ferrous sulfate was added to the second raw sample to add additional iron and sulfates followed by powdered lime addition to avoid dilution effects. Sulfurous acid UV treatment of the filtrates was then performed to alter the selenium species composition.

Specifically, 600 ml of the raw composite second sample was drawn and approximately 1 gram of Calcium Hydroxide to adjust the pH to 9.03 resulting in a slight white flock.

Approximately 1 gram of ferrous sulfate reducing agent [sat~30.4 gr/L Heptahydrate ($FeSO_4 \cdot 7H_2O$—278.02 g/m) or 0.11 m/L (light green at 20.2° C., pH 3.53)] was added to the elevated pH third sample forming a cloudy iron colored solution with a pH of 7.86. Additional calcium hydroxide was added to raise the pH to 9.21 and stirred for 10 minutes until a ferric/metal hydroxide and metal/calcium sulfate precipitate and maghemite 50 ml layer was formed.

The suspended solids were decanted and filtered producing a clear pH 9.18 filtrate.

250 ml filtrate was sent to American West Analytical for total selenium and metals testing to determine the effects ferrous sulfate/lime addition alone on total selenium and heavy metals reduction. [0.45 μm filter paper was used separating a much darker iron colored black precipitate]

The American West Analytical tests showed the following:

| Results | | EPA Clean Water Standard[4] |
|---|---|---|
| Arsenic | <0.002 mg/L | 0.010 mg/L (10 μ/L) |
| Chromium | <0.00200 mg/L | 0.1 mg/L (100 μ/L) |
| Copper | 0.00615 mg/L | 1.3 mg/L (130 μ/L) |
| Iron | <0.100 mg/L | .3 mg/L (300 μ/L) |
| Lead | <0.002 mg/L | 0.015 mg/L (15 μ/L) |
| Mercury | 0.000430 mg/L | 0.002 mg/L (2 μ/L) |
| Selenium | 0.0475 mg/L | 0.05 mg/L (50 μ/L) |
| Zinc | <0.00500 mg/L | 5 mg/L (5000 μ/L) |

Next, ~10 ml pH 1.1 sulfurous acid was added to 250 ml of the clear filtrate to lower the pH to 5.79 forming a clear filtrate solution and irradiated the with UV-L light (λ 253.7 nm) light for ½ hour. The EPA National Primary Drinking Water Regulations, 40 CFR 141, https://www.epa.gov/ground-water-and drinking-water/national-prima . . . Jan. 2, 2018 is shown in the right column below:

| Results | | EPA Standard |
|---|---|---|
| Arsenic | 0.002 mg/L | 0.010 mg/L (10 μ/L) |
| Chromium | <0.00200 mg/L | 0.1 mg/L (100 μ/L) |
| Copper | 0.00401 mg/L | 1.3 mg/L (130 μ/L) |
| Iron | <0.182 mg/L | .3 mg/L (300 μ/L) |
| Lead | <0.002 mg/L | 0.015 mg/L (15 μ/L) |
| Mercury | 0.000357 mg/L | 0.002 mg/L (2 μ/L) |
| Selenium | 0.0440 mg/L | 0.05 mg/L (50 μ/L) |
| Zinc | 0.018 mg/L | 5 mg/L (5000 μ/L) |

The irradiated filtrate was again filtered and sent to the TestAmerica Lab for selenium speciation testing. The filter showed a minimal light grey precipitate.

The TestAmerica Lab UV sample results showed a total selenium level of 48 μ/L, a selenate concentration of 32 μ/L and a selenite concentration of 1.8 μ/L, which met the clean water standards, but did not meet the 1 μ/L threshold levels for selenite and selenate, and total selenium of 5 u/L required for power plant discharge under 40 CFR 423.

To test the effects of an additional reducing agent, the first three steps were repeated first adjusting the pH to 9.07 with approximately 1 gram of Calcium Hydroxide, and adding approximately 1 gram of ferrous sulfate producing a cloudy iron colored solution with a pH of 7.4. Additional calcium hydroxide was added to raise the pH to 9.04 and stirred for 10 minutes until the ferric/metal hydroxide and metal/calcium sulfate precipitate and maghemite layer was formed and removed via filtration.

The filtrate was reduced to pH 6.02 with ~2 ml sulfurous acid (0.1M).

6.5 ml sodium sulfide solution (0.1M) was then added to the filtrate to precipitate metal sulfides and selenium (II) sulfide, selenium (IV) sulfide precipitates. The sodium sulfide treatment fainted a light grey film on the filter paper vs the orange-brown ferrous sulfate precipitates.

250 ml of the second filtrate was sent to the American West Analytical lab for total selenium and heavy metals analysis. The American West Analytical showed the following results:

| Results | | EPA Drinking Water Standard |
|---|---|---|
| Arsenic | 0.00213 mg/L | 0.010 mg/L (10 μ/L) |
| Chromium | <0.00200 mg/L | 0.1 mg/L (100 μ/L) |
| Copper | 0.00401 mg/L | 1.3 mg/L (130 μ/L) |
| Iron | 0.182 mg/L | .3 mg/L (300 μ/L) |
| Lead | <0.002 mg/L | 0.015 mg/L (15 μ/L) |
| Mercury | 0.000357 mg/L | 0.002 mg/L (2 μ/L) |
| Selenium | 0.0440 mg/L | 0.05 mg/L (50 μ/L) |
| Zinc | 0.0108 mg/L | 5 mg/L (5000 μ/L) |

The results were again within the clean water discharge standards, but not within the power plant discharge standards.

Lastly, ~2 ml pH 1.1 sulfurous acid was added to 250 ml of the second filtrate to lower the pH to 6.48 forming a fairly clear filtrate solution, which was irradiated with UV-L light (λ 253.7 nm) light for ½ hour. After filtering, a much darker precipitate was left on the filter compared to the lighter grey film on the previous filter. This would appear to be metal sulfides, as selenium sulfides are orange in color.

The irradiated second filtrate was then sent to the TestAmerica Lab for selenium speciation testing. The TestAmerica Lab UV sample results showed a selenate concentration of 31 μ/L, a selenite concentration of ND, and a selenocyanate concentration of 0.56 u/L, which did not meet the 1 μ/L threshold levels required for power plant discharge. Total selenium was reduced to 44 μ/L, but again well above the power plant discharge level of 5 μ/L.

The pre-treatment method provides an inexpensive chemical installation and method to remove heavy metals and selenium from industrial wastewaters to meet drinking water discharge standards for selenium of less than 0.05 μg/L. Further, the filtered wastewaters are exposed to ultraviolet light for sufficient time for disinfection, making them safe to use.

To meet the most restrictive selenium discharge standard for Flue Gas Discharge under the Steam Electric Power Generating Point Source Regulations for New Source Performance Standards for effluent discharge of 1 μg/L total selenium, additional processes, such as biological reduction, reverse osmosis, or membrane removal must therefore be included at the above pre-treatment, which removes most of the heavy metals, and other precipitates shown in the above photographs. Pre-treatment thus significantly reduces loading before applying other selenium removal methods, and saves pumping and other energy costs associated with biological reduction, reverse osmosis, chemical reduction, and membrane removal.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description.

I claim:

1. A treatment method reducing selenium and heavy metals in industrial wastewaters comprising:
   a. adding iron cations and sulfates to the wastewaters to insure sufficient iron cation concentrations for selenium co-precipitation,
   b. raising, the pH of the iron adjusted wastewaters with lime to above pH 8.5 to form metal hydroxide precipitates with adsorbed selenium, calcium precipitates, and metal sulfate precipitates,
   c. removing the metal hydroxide precipitates with adsorbed selenium and metal sulfate precipitates forming a metal and selenium reduced filtrate,
   d. adding sulfurous acid to the metal and selenium reduced filtrate to adjust the pH of the filtrate between 6.5 and 9 and exposing the filtrate to ultra violet light to reduce any remaining selenium species, and
   e. removing the metal and selenium precipitates to produce a treated water suitable for open stream discharge where fish are not present or land application.

2. The treatment method reducing selenium and heavy metals in industrial wastewaters according to claim 1, including adding sulfides to the pH adjusted metal and selenium reduced filtrate to precipitate metal and selenium sulfides, and then removing the metal and selenium sulfide precipitates to produce a treated water below 1 ug/l suitable for open stream discharge where fish are present.

3. The treatment method reducing selenium and heavy metals in industrial wastewaters according to claim 2, wherein the sulfides are selected from the group comprising sodium sulfide, hydrogen sulfide and ammonium sulfide.

4. The treatment method reducing selenium and heavy metals in industrial wastewaters according to claim 1, including exposing the treated water to biological, reverse osmosis, or membrane treatment to meet open stream discharge requirements where fish are present and electrical power plant discharge requirements.

5. The treatment method reducing selenium and heavy metals in industrial wastewaters according to claim 1, wherein the ultra violet light exposure time is sufficient to inactivate pathogens and viruses.

6. The treatment method reducing selenium and heavy metals in industrial wastewaters according to claim 1, including aerating the treated water to provide dissolved oxygen where required for open stream discharge.

7. The treatment method reducing selenium and heavy metals in industrial wastewaters according to claim 1, including adding activated carbon to the treated water to sorb any remaining heavy metals, chemicals, pharmaceuticals, and organics for removal to produce a treated water suitable for open stream discharge where fish are present, or land application.

8. The treatment method reducing selenium and heavy metals in industrial wastewaters according to claim 1, including passing the treated water through ionic exchange resins, zeolites and natural zeolitic tuffs, for selenium and heavy metals sorption removal to produce a treated water suitable for open stream discharge where fish are present, or land application.

* * * * *